United States Patent [19]
Hara

[11] Patent Number: 5,273,364
[45] Date of Patent: Dec. 28, 1993

[54] BALL SCREW DRIVEN LINEAR MOTION ROLLING CONTACT GUIDE UNIT

[75] Inventor: Takehiko Hara, Yokohama, Japan

[73] Assignee: Nippon Thompson Co., Ltd., Japan

[21] Appl. No.: 928,812

[22] Filed: Aug. 12, 1992

[30] Foreign Application Priority Data

Aug. 13, 1991 [JP] Japan .................. 3-228325

[51] Int. Cl.$^5$ .............................................. F16C 29/06
[52] U.S. Cl. .................................. 384/8; 384/45; 384/99
[58] Field of Search ............... 384/8, 12, 45, 99, 37, 384/43

[56] References Cited

U.S. PATENT DOCUMENTS

| | | | |
|---|---|---|---|
| 4,953,988 | 9/1990 | Tsukada | 384/8 |
| 4,981,415 | 1/1991 | Marmol et al. | 384/99 |
| 5,071,262 | 12/1991 | Monzel | 384/99 |
| 5,181,780 | 1/1993 | Morita | 384/8 |

Primary Examiner—Lenard A. Footland
Attorney, Agent, or Firm—Skjerven, Morrill, MacPherson, Franklin & Friel

[57] ABSTRACT

A ball screw driven linear motion rolling contact guide unit includes a rail having a generally U-shaped cross section and a ball screw shaft and a slider received in the rail and operatively coupled to the ball screw shaft. A plurality of rolling members are interposed between the slider and the rail. The rail has a bottom wall formed with a trench in which a quantity of damping oil is reserved. The slider is provided with a projection which projects into the trench to thereby define a squeeze film damper mechanism. The slider is also provided with an endless circulating path, including a load path section, a return path section and a pair of curved connecting path sections, each connecting the corresponding ends of the load and return path sections, whereby the return path section is located lower in level than the load path section.

6 Claims, 4 Drawing Sheets

BALL SCREW DRIVEN LINEAR MOTION ROLLING CONTACT GUIDE UNIT

BACKGROUND OF THE INVENTION

1 Field of the Invention

This invention relates generally to a linear motion guide unit, and, in particular, to a ball screw driven linear motion rolling contact guide unit suitable for use in various high precision machining tools and testing apparatuses.

2. Description of the Prior Art

A ball screw driven linear motion guide unit is well known in the art as described, for example, in the Japanese Patent Laid-open Pub. No. 2-298446, and such a guide unit is schematically shown here in FIG. 5. As shown, the guide unit of the above-identified patent application includes a slider B provided with a ball screw mechanism A at the center thereof extending in a longitudinal direction, which is perpendicular to the plane of the drawing. The slider B is received in a channel defined by a rail having a generally U-shaped cross section and is provided with a pair of upper endless circulating paths provided with balls C and another pair of lower endless circulating paths provided with balls D. As well known in the art, each of the endless circulating paths includes a load path section, a return path section E, F and a pair of curved connecting path sections, each connecting the corresponding ends of the load and return path sections. Each of the load path sections is defined by a pair of an inner guide groove formed in a side surface of the slider B and an outer guide groove formed in an inner side surface of the U-shaped rail arranged in an opposed relationship. The ball screw mechanism A generally includes a ball screw which extends through a threaded hole extending through the slider B in a threaded relationship, so that when the ball screw rotates, the slider B is caused to move linearly along its longitudinal axis relative to the rail.

As described above, the ball screw driven linear motion rolling contact guide unit shown in FIG. 5 is capable of providing a relative linear motion between the slider B and the rail under the control of the ball screw mechanism A. However, since there is provided no damping mechanism, the movement of the slider B can be erratic or abrupt in particular when the slider B is set in motion or brought to a halt. Moreover, when the slider B moves back and forth in a reciprocating manner, the movement of the slider B may lack smoothness because of the possible play between the ball screw and the slider B. Besides, the slider B may be set in vibration or rattling motion to cause noises.

In addition, since the return path section E, F of each of the endless circulating paths is located in the slider B at a location horizontally inside of its associated load path section. As a result, mounting holes for use in mounting desired objects on the slider B must be provided at a location between the load and return path sections. Thus, there is a significant limitation in the degree of freedom in mounting an object on the slider B.

SUMMARY OF THE INVENTION

In accordance with the present invention, there is provided a linear motion rolling contact guide unit, comprising: a rail having a generally U-shaped cross section, said rail including a bottom wall and a pair of side walls extending upward from each side of said bottom wall, each of said side walls being formed with an outer guide groove at its inner surface extending in a direction in parallel with a longitudinal axis of said guide unit, said bottom wall being formed with a trench for receiving therein a quantity of liquid; a slider slidably received in a space defined by said rail and provided with an inner guide groove at its outer surface in an opposed relationship with an associated one of said outer guide grooves to define a load path section, a return path section and a pair of curved connecting path sections, each connecting the corresponding ends of said load and return path sections to thereby define an endless circulating path; a plurality of rolling members provided in said endless circulating path, said slider including a projection projecting into said trench to thereby define a squeeze film damper mechanism; and a ball screw mechanism operatively coupled to said slider so as to move said slider relative to said rail.

Preferably, the liquid contained in the trench is oil having a desired degree of viscosity. In the preferred embodiment, the return path section is located at a level lower than a level defined by connecting the centers of the left and right inner guide grooves of the slider on its opposite side surfaces.

It is therefore a primary object of the present invention to provide an improved ball screw driven linear motion rolling contact guide unit.

Another object of the present invention is to provide a ball screw driven linear motion rolling contact guide unit having a damping characteristic.

A further object of the present invention is to provide a ball screw driven linear motion rolling contact guide unit smooth in operation and high in precision.

A still further object of the present invention is to provide a ball screw driven linear motion rolling contact guide unit high in degree of freedom in applications, in particular in mounting a desired object on a slider.

Other objects, advantages and novel features of the present invention will become apparent from the following detailed description of the invention when considered in conjunction with the accompanying drawings.

DESCRIPTION OF THE PREFERRED EMBODIMENTS

Figure 1:
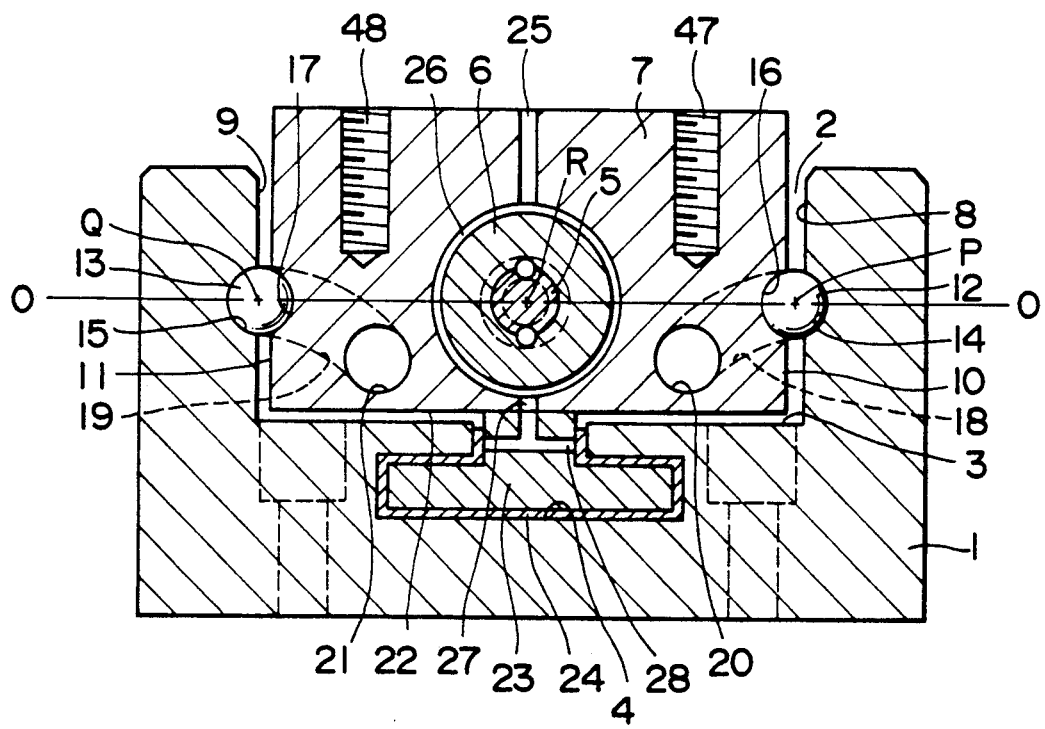
FIG. 1 is a schematic illustration showing in transverse cross section a ball screw driven linear motion rolling contact guide unit constructed in accordance with one embodiment of the present invention.
Figure 2:
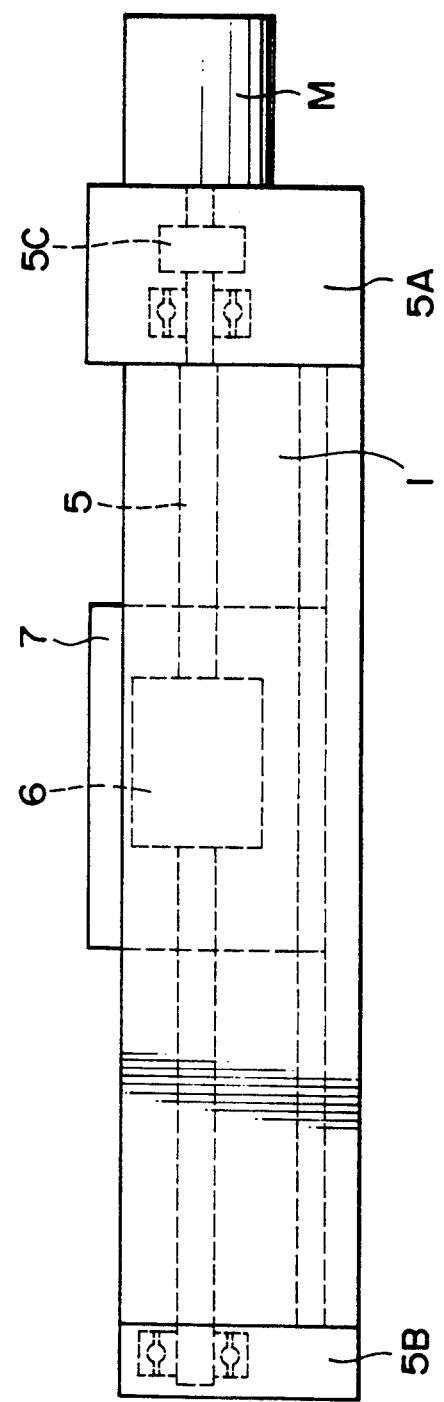
FIG. 2 is a schematic illustration showing in side elevation the guide unit of FIG. 1.
Figure 3:
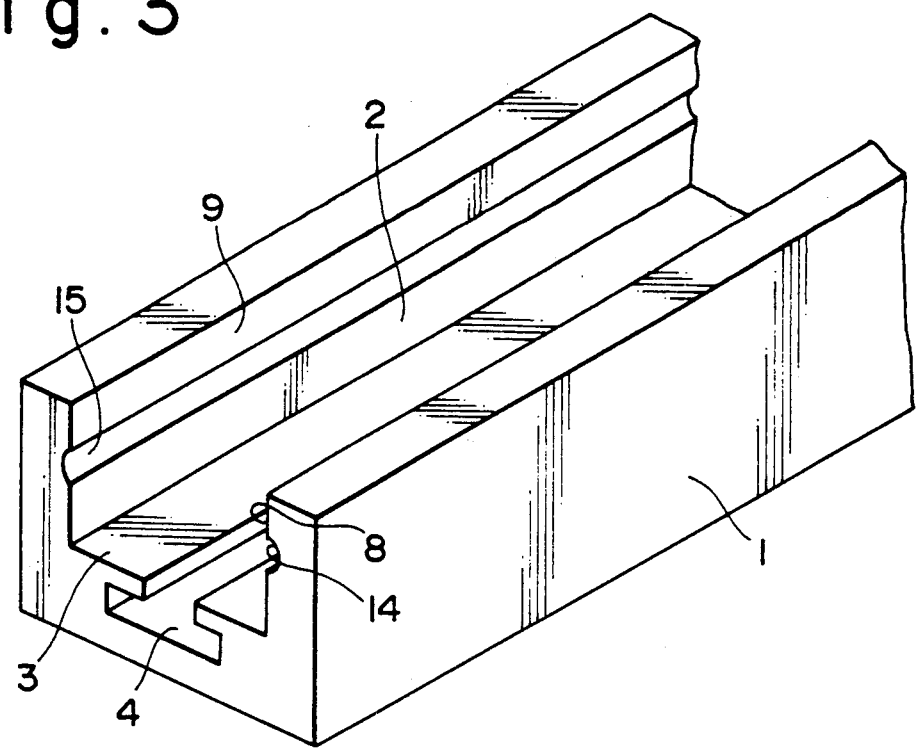
FIG. 3 is a schematic illustration showing partly in perspective view a rail employed in the guide unit of FIG. 1.

Referring to FIGS. 1 through 3, there is schematically shown a ball screw driven linear motion rolling contact guide unit constructed in accordance with one embodiment of the present invention. As shown, the present guide unit includes an elongated rail 1 having a generally U-shaped cross section, so that the rail 1 includes a bottom wall 3 and a pair of side walls 8, 9 extending upward from each side of the bottom wall to thereby define a space 2. As best shown in FIG. 3, each of the side walls 8, 9 is formed with an outer guide groove 14, 15, respectively, at its inner surface. Each of the outer guide grooves 14, 15 extends straight in parallel with the longitudinal axis of the rail. The bottom wall 3 is formed with a trench 4 which extends in parallel with the longitudinal axis of the rail 1 and has a specific cross section, including a narrow open section and a wider closed section.

As shown in FIG. 2, the rail 1 is provided with a pair of support end blocks 5A and 5B at its opposite ends, and a ball screw shaft 5 extends between and rotatably supported by the support end blocks 5A and 5B. The ball screw shaft 5 extends through and located approximately at the center of the space 2. A reversibly rotatable motor M is mounted on the support end block 5A and the motor M is operatively coupled to the ball screw shaft 5 via a coupling 5C mounted on the support end block 5A. Thus, depending on the direction of rotation of the motor M, the ball screw shaft 5 may be driven to rotate in either direction.

A slider 7 is disposed inside the space 2 defined by the rail 1 and the slider 7 is formed with a through-hole approximately at its center and provided with a ball screw nut 6. The ball screw shaft 5 extends through the slider 7 in a threaded engagement with the ball screw nut 6. As a result, when the ball screw shaft 5 rotates, the slider 7 is caused to move in either direction along the longitudinal axis depending on the direction of rotation of the shaft 5.

The slider 7 is formed with an inner guide groove 16, 17 at its side surface 10, 11 in an opposed relationship with its associated outer guide groove 14, 15, respectively, to thereby define a load path section. The slider 7 is also provided with a return path section 20, 21 and a pair of curved connecting path sections 18, 19, each connecting the corresponding ends of the load and return path sections. Thus, the slider 7 in the illustrated embodiment is provided with a pair of endless circulating paths, each including a load path section, a return path section and a pair of curved connecting path sections, each connecting the corresponding ends of the load and return path sections. Each of these endless circulating paths is provided with a plurality of balls 12, 13 so that a rolling contact is provided between the slider 7 and the rail 1 by those balls 12, 13 which are located in the load path sections. Since the balls 12, 13 may roll along the associated endless circulating paths indefinitely, the slider 7 may move relative to the rail 1 linearly as long as the rail 1 extends.

In one embodiment of the present invention, the return path sections 20, 21 are located at a level lower than a level O—O defined by a hypothetical straight line obtained by connecting the centers of the load path sections, or the centers of the balls 12, 13 located in the load path sections, as shown in FIG. 1. In this embodiment, the curved connecting path sections 18, 19 do not extend horizontally, but they extend downwardly from the load path section 14-16, 15-17 toward the return path section 20, 21. Such a structure is advantageous because it allows to provide an increased degree of freedom in locating mounting holes 47, 48 at the top surface of the slider 7 without increasing the overall size of the slider 7 and thus of the guide unit. In the present embodiment, use is made of balls as rolling members, but it is to be noted that use may also be made of any other type of rolling members, such as rollers. In addition, in the illustrated embodiment, the level of line O—O is at the same level as the center of the ball screw shaft 5, but line O—O may be set at a different level, if desired.

The slider 7 is also provided with a projection 23 which projects downward from a bottom surface 22 of the slider 7. The projection 23 has a narrowed base section and a wider wing section complementary in shape to the trench 4 of the rail 1 and is received in the trench 4 with a clearance therebetween. A quantity of liquid, such as oil, is provided in the trench 4, so that a squeeze film 24 is formed between the projection 23 and the trench 4 as a squeeze film damper mechanism. Such a structure is advantageous in absorbing or damping undesired vibration occurring in the slider 7, thereby insuring a smooth movement and accurate positioning of the slider 7 at all times.

The slider 7 is provided with a passage including passage sections 25, 26, 27 and 28, leading from the top surface of the slider 7 to a side surface of the base section of the projection 23. Thus, oil may be supplied into the trench 4 through this passage.

Figure 4:
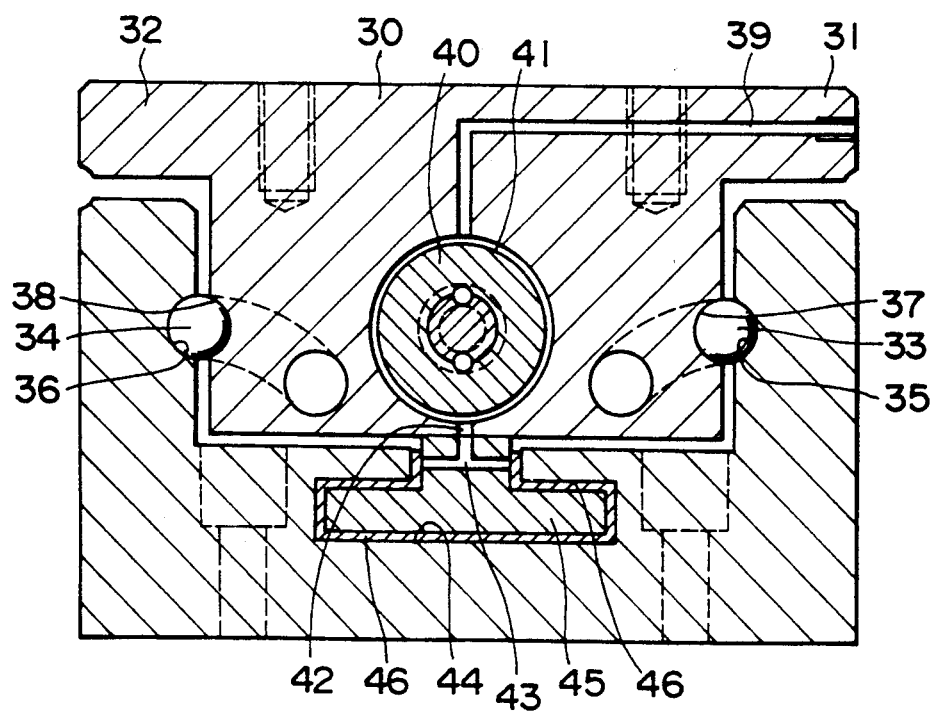
FIG. 4 is a schematic illustration showing in transverse cross section a ball screw driven linear motion rolling contact guide unit constructed in accordance with another embodiment of the present invention.
Figure 5:
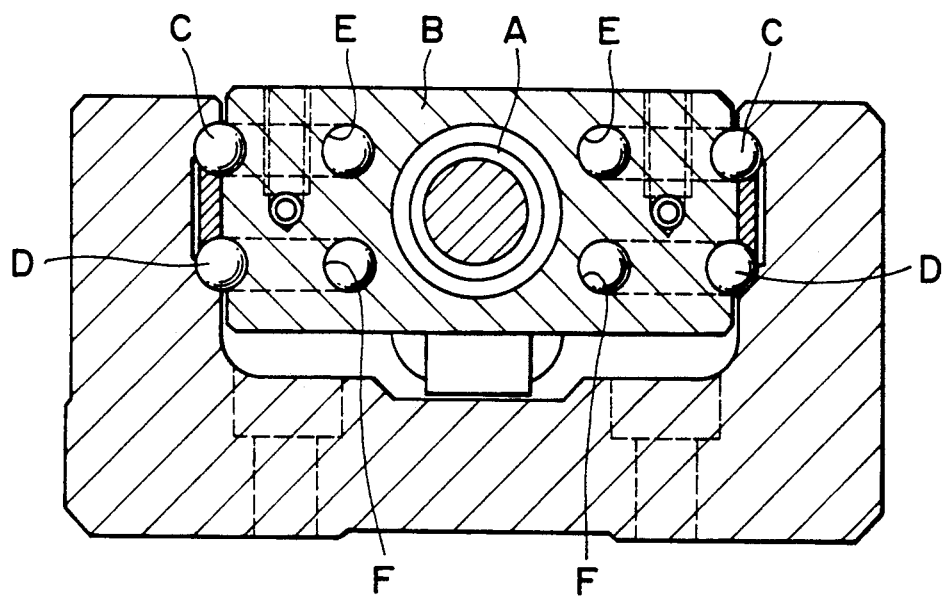
FIG. 5 is a schematic illustration showing in transverse cross section a typical prior art ball screw driven linear motion rolling contact guide unit.

FIG. 4 illustrates a modified structure of the ball screw driven linear motion rolling contact guide unit shown in FIGS. 1-3. However, the structure shown in FIG. 4 is similar in many respects to the structure shown in FIGS. 1-3, though different reference numerals are used. The structure shown in FIG. 4 differs from the structure shown in FIGS. 1-3 only in the provision of a horizontally extending section 31, 32 which extends from each side of the slider 30 and the provision of an oil passage 39 which extends through the horizontally extending section 31. The horizontally extending sections 31, 32 serve to cover the gap between the slider 30 and the rail, thereby allowing to prevent undesired foreign matter from entering into the load path sections. In addition, these horizontally extending sections 31, 32 provide an enlarged mounting surface at the top surface of the slider 30.

While the above provides a full and complete disclosure of the preferred embodiments of the present invention, various modifications, alternate constructions and equivalents amy be employed without departing from the true spirit and scope of the invention. Therefore, the above description and illustration should not be construed as limiting the scope of the invention, which is defined by the appended claims.

What is claimed is:

1. A linear motion rolling contact guide unit, comprising:
 a rail having a generally U-shaped cross section, said rail including a bottom wall and a pair of side walls extending upward from each side of said bottom wall, each of said side walls being formed with an outer guide groove at its inner surface extending in a direction in parallel with a longitudinal axis of said guide unit, said bottom wall being formed with a trench for receiving therein a quantity of liquid;
 a slider slidably received in a space defined by said rail and provided with an inner guide groove at its outer surface in an opposed relationship with an associated one of said outer guide grooves to define a load path section, a return path section and a pair of curved connecting path sections, each connecting the corresponding ends of said load and return path sections to thereby define an endless circulating path, said slider including a projection projecting into said trench to thereby define a squeeze film damper mechanism;

a plurality of rolling members provided in said endless circulating path; and a ball screw mechanism operatively coupled to said slider so as to move said slider relative to said rail.

2. The guide unit of claim 1, wherein said return path section is located at a level lower than said load path section.

3. The guide unit of claim 1, wherein said trench has a narrow open section and a wider closed section.

4. The guide unit of claim 3, wherein said projection is complementary in shape to said trench.

5. The guide unit of claim 1, wherein said slider is provided with a passage extending therethrough and leading from an inlet mouth at an exposed surface of said slider to an outlet opening located at said projection, so that the liquid may be supplied to said trench through said passage.

6. The guide unit of claim 1, wherein said slider is provided with a horizontally extending section which extends over a gap between said slider and an oppositely located side wall of said rail.

* * * * *